United States Patent
Rist

[11] 3,907,085
[45] Sept. 23, 1975

[54] CLUTCH WITH REMOVABLE HYDRAULIC OPERATOR

[75] Inventor: Michel Rist, Boulogne, France

[73] Assignee: Societe Anonyme Francaise du Ferodo, Paris, France

[22] Filed: Jan. 22, 1974

[21] Appl. No.: 435,580

[30] Foreign Application Priority Data
Feb. 2, 1973 France .............................. 73.03678

[52] U.S. Cl. ............. 192/91 A; 192/85 CA; 92/128
[51] Int. Cl.² ......................................... F16D 25/08
[58] Field of Search ........ 192/85 AA, 85 CA, 91 A, 192/88 A, 70.29, 70.3; 92/128, 146; 91/54

[56] References Cited
UNITED STATES PATENTS

| | | | |
|---|---|---|---|
| 2,592,168 | 4/1952 | Morris et al. | 92/146 |
| 2,873,834 | 2/1959 | Kepner | 192/85 CA X |
| 3,011,609 | 12/1961 | Wilson | 192/88 A |
| 3,779,353 | 12/1973 | Maucher | 192/99 A X |
| R23,326 | 1/1951 | Fleischel | 192/85 CA X |

*Primary Examiner*—Benjamin W. Wyche
*Attorney, Agent, or Firm*—Young & Thompson

[57] ABSTRACT

The invention relates to a fluid-operated clutch and provides a clutch operating thrust bearing which is formed with a generally stirrup-shaped casing which may be located in position on a sleeve co-axial with the driving and driven shafts by simple engagement.

15 Claims, 8 Drawing Figures

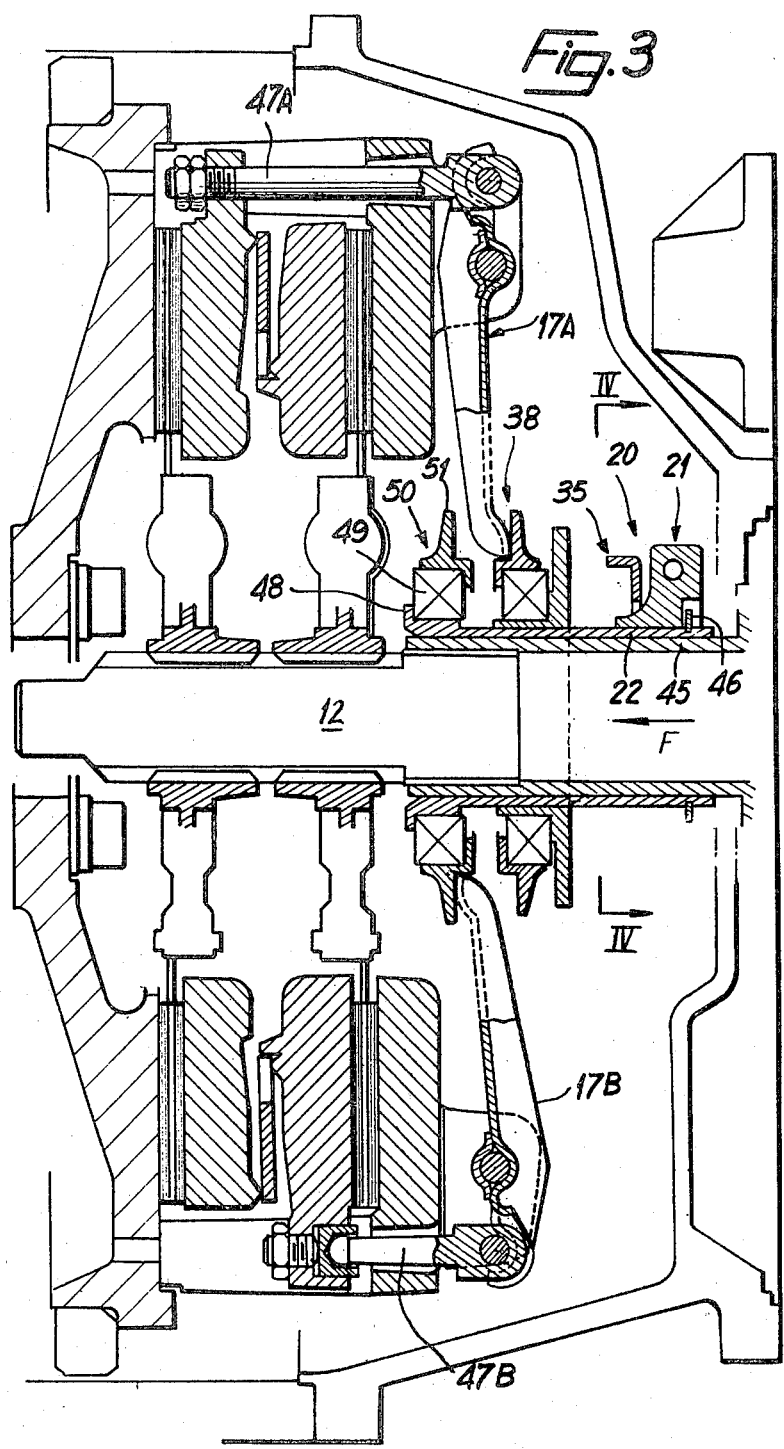

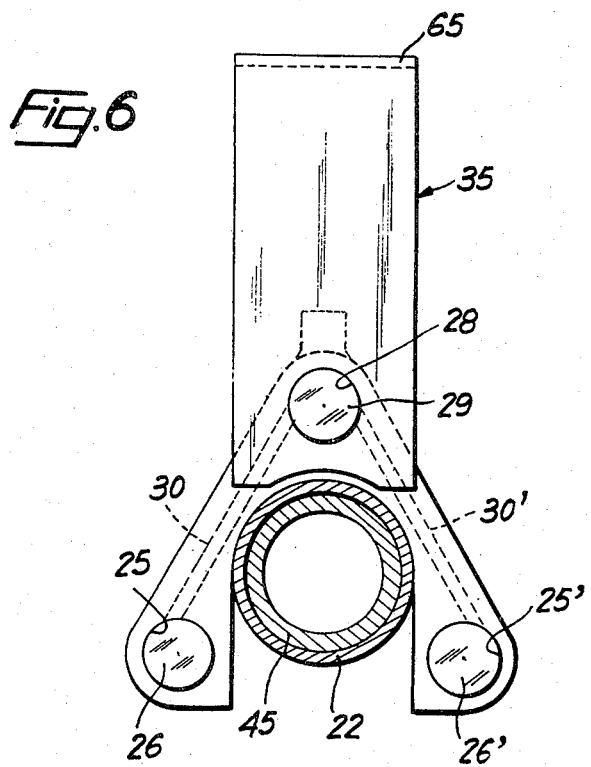
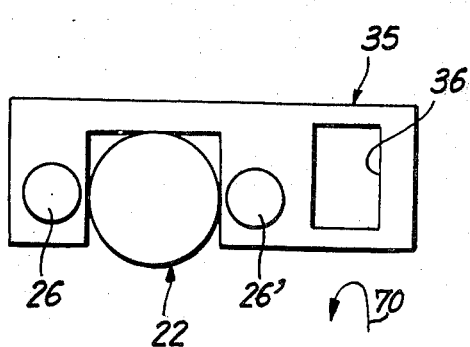
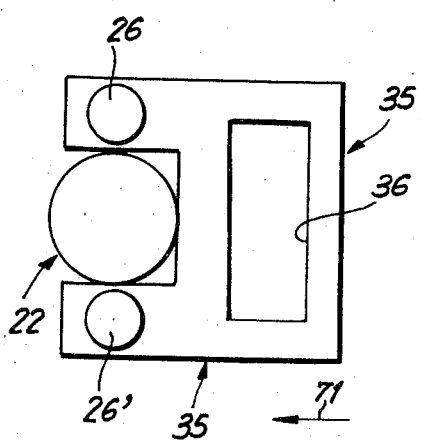

CLUTCH WITH REMOVABLE HYDRAULIC OPERATOR

BACKGROUND OF THE INVENTION

1. Field of the Invention

The present invention relates generally to clutches, particularly for motor vehicles, and refers more particularly to clutches of this kind which are operated by fluid pressure, e.g., hydraulically.

2. Description of the Prior Art

Generally speaking, a clutch comprises at least one clutch assembly comprising a reaction plate intended to be rotationally fixed to a first shaft, generally a drive shaft, a friction disc which is movable axially in relation to the reaction plate and is intended to be rotationally fixed on a second shaft, generally a driven shaft, a pressure plate axially movable in relation to the reaction plate and rotationally fixed on the latter, elastic means which urge the pressure plate in the direction of the reaction plate in order to clamp the friction disc, and at least one pivoting clutch release lever adapted to effect the release of the friction disc.

The element necessary for operating the clutch release lever or levers is generally known as the clutch release thrust bearing and is operated either mechanically or hydraulically by a clutch release pedal.

In the case of a mechanically operated clutch release thrust bearing, the efficiency ratio between the force applied to the clutch release pedal and the force axially transmitted to the thrust bearing by the mechanical linkage interposed between the latter and the pedal is relatively poor due to the play and flexibility inevitably present in a mechanical linkage of this kind. In addition, because of this play and flexibility and also because the clutch release thrust bearing is not generally held in contact with the clutch release lever or levers, the response of a mechanically operated clutch release thrust bearing of this kind is not immediate, and the backlash or idle travel of the pedal operating it must be frequently adjusted.

Hydraulically operated clutch release thrust bearings do not have these disadvantages, and in particular they have good efficiency; however, up to the present time hydraulically operated clutch release thrust bearings have been located in a circular continuous casing engaged axially on the shaft connecting the clutch to the gearbox.

In consequence, the slightest operating incident, for example the slightest leakage, makes it necessary for a hydraulically operated clutch release bearing of this kind to be removed for repair or replacement; in order to effect this removal, it is necessary to disconnect the clutch from the gearbox, and this very substantial dismantling operation is lengthy, complex, and expensive.

The main object of the present invention is to provide an arrangement which enables this disadvantage to be overcome.

SUMMARY

According to the invention, a clutch of the kind comprising at least one clutch assembly of the kind briefly described above, in combination with fluid operating means adapted to control the pivoting of the clutch release lever or levers associated with the said clutch assembly, is characterized in that the said fluid operating means constitute a detachable unit comprising a casing having the general shape of a stirrup which can be placed in position by simple engagement on any sleeve coaxial to a shaft of the clutch, transversely in relation to the said sleeve.

Thus these fluid operating means, that is to say in particular the hydraulic operating means of this clutch release thrust bearing, can be removed or replaced without difficulty.

This advantage is obtained without sacrificing the traditional advantages of hydraulic clutch release thrust bearings, namely on the one hand adequate efficiency and on the other hand the ability to maintain a residual pressure permitting immediate response and eliminating the need for adjustment of backlash.

The arrangement according to the invention is equally applicable to the operation of clutches comprising only one clutch assembly and to clutches comprising a plurality of clutch assemblies; in particular, it is applicable to clutches permitting the coupling of a drive shaft either to a single driven shaft or to one or the other of a plurality of driven shafts; it is also applicable to clutches having a plurality of friction discs.

In the case of a clutch having only one clutch assembly, the fluid operating means of the invention assists the adaptation of another advantageous arrangement, which is known per se and in which, when the clutch is of the diaphragm type, that is to say of the type in which the elastic means comprise an elastic washer of the Belleville washer type extended radially in the direction of the axis by fingers forming clutch release levers, this elastic washer is supported directly on the one hand on the pressure plate, by its inner periphery, and on the other hand on a cover solid with the reaction plate, by its outer periphery.

Moreover, in the case of a clutch comprising a plurality of clutch assemblies, and in particular a clutch comprising two clutch assemblies, the arrangement according to the invention is equally suitable for operating in a single axial direction as for operating in two opposite axial directions, one for pushing against the clutch release levers associated with a first clutch assembly, and the other for pulling on the clutch release levers associated with the second clutch assembly.

BRIEF DESCRIPTION OF THE DRAWINGS

FIGS. 3 and 4 are views respectively similar to FIGS. 1 and 2, and relate to another clutch and another form of construction of the hydraulically operated clutch release thrust bearing of the invention; FIG. 4 being a view in section taken along the line IV—IV in FIG. 3;

FIGS. 5 and 6 are views respectively similar to FIGS. 1 and 2 and also relate to another cluth and to another form of construction of the hydraulically operated clutch release thrust bearing of the invention;

FIGS. 7 and 8 each illustrate another form of construction of the hydraulically operated clutch release thrust bearing of the invention.

DESCRIPTION OF THE PREFERRED EMBODIMENTS

Figure 1:
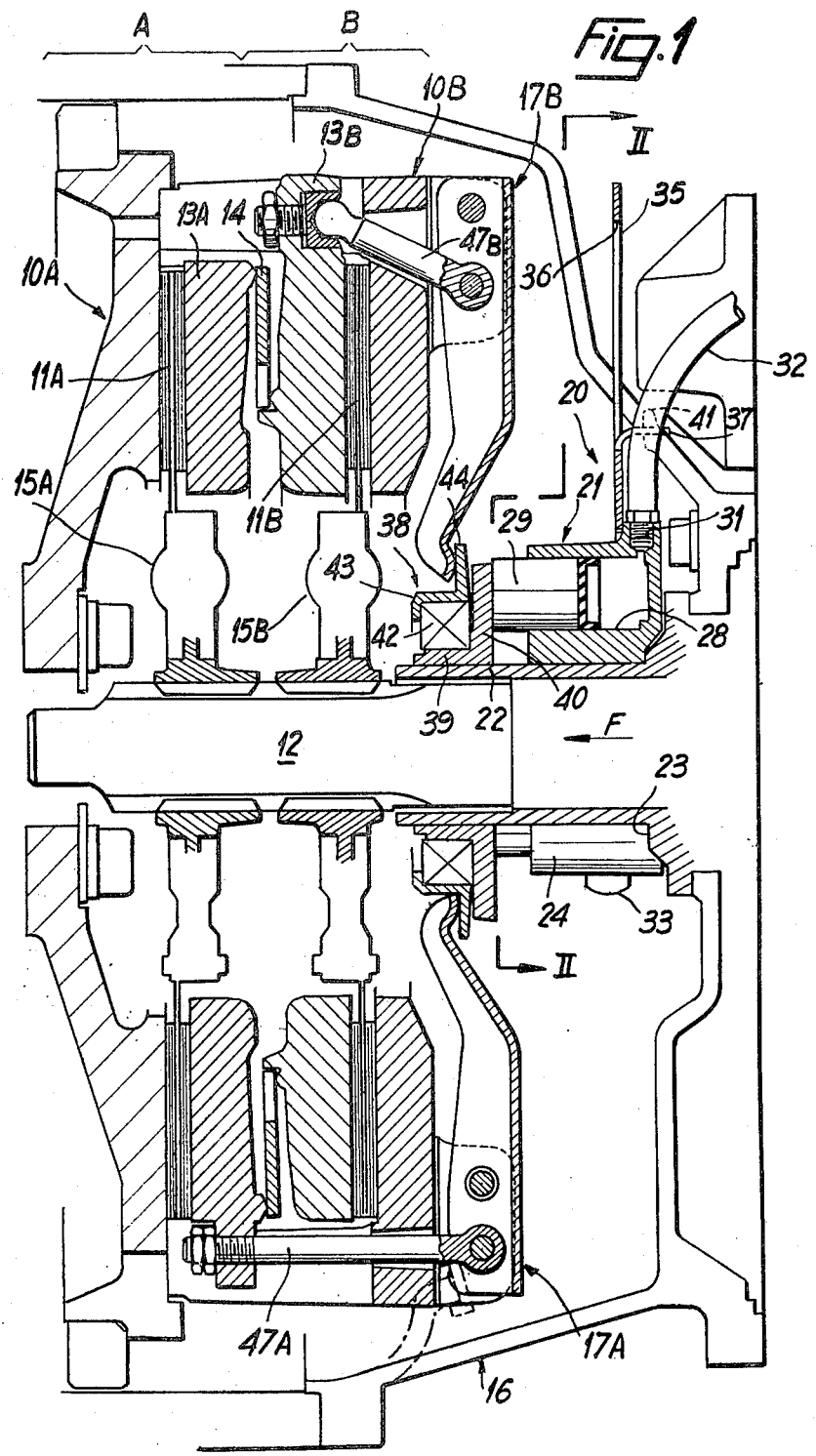
FIG. 1 is a diagrammatical view in axial section of a clutch equipped with a hydraulically operated clutch release thrust bearing according to the invention.
Figure 2:
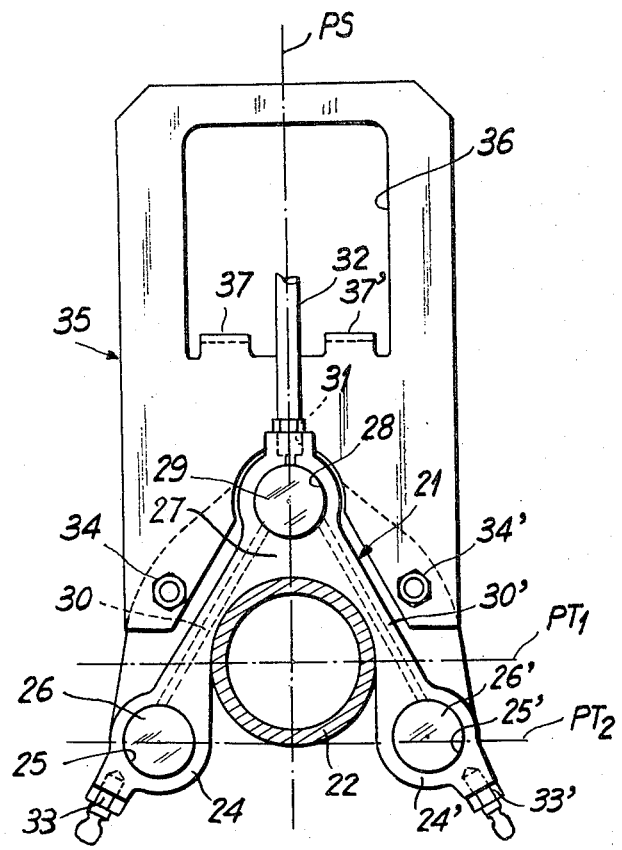
FIG. 2 is a cross-section of this clutch release thrust bearing taken along the broken line II—II in FIG. 1.

FIGS. 1 and 2 illustrate by way of example the application of the invention to a clutch comprising two friction discs and a single driven shaft.

A clutch of this kind comprises in succession two clutch assemblies A, B disposed axially one following the other.

The clutch assembly A comprises a reaction plate 10A forming a flywheel and intended to be rotationally fixed on a first shaft, generally a drive shaft (not shown), a friction disc 11A movable axially in relation to the reaction plate 10A and rotationally fixed on a shaft 12, generally a driven shaft, and a pressure plate 13A movable axially in relation to the reaction plate 10A and rotationally fixed on the latter.

Similarly, the clutch assembly B comprises a reaction plate 10B fastened to the reaction plate 10A, a friction disc 11B which is secured on the driven shaft 12 and a pressure plate 13B which is movable axially in relation to the reaction plate 10B and is rotationally fixed on the latter.

In the example illustrated the reaction plates 10A, 10B enclose the pressure plates 13A, 13B, and between the latter is disposed an elastic washer 14 of the Belleville washer type, forming elastic means which are common to the pressure plates 13A, 13B and which urge these pressure plates in the direction of the corresponding reaction plates 10A, 10B, in order to clamp the friction discs 11A, 11B.

Moreover, in the example illustrated torsion damping devices 15A, 15B are interposed between the friction discs 11A, 11B and the driven shaft 12, and the whole arrangement is disposed in a fixed casing, which for example is fastened to the casing of the associated gearbox.

With the clutch assembly A is associated a set of clutch release levers 17A mounted for pivoting on the reaction plate 10B and adapted to control the release of the friction disc 11A; in the example illustrated in FIG. 1 the clutch release levers 17A are connected to the pressure plate 13A by tie rods 47A.

Similarly, there is associated with the clutch assembly B a set of clutch release levers 17B mounted for pivoting on the reaction plate 10B and adapted to control the release of the friction disc 11B; in the examples shown in FIG. 1 the clutch release levers 17B act on the pressure plate 13B by means of push-rods 47B which are attached to them between their pivot and the clutch axis.

These arrangements are well known per se and are therefore not described in detail below. The clutch release levers 17A, 17B extend substantially radially and in order to effect the unclamping of the friction discs 11A, 11B it is sufficient to operate them pivotally by applying axially a thrust force to their free end which is nearer the axis of the assembly, in the direction of the arrow F in FIG. 1.

According to the invention, and in accordance with the embodiment illustrated, a thrust of this kind can be applied by fluid operating means constituting a removable unit 20, this removable unit comprising a generally stirrup-shaped casing 21 which has two arms and is associated with a sleeve 22 disposed coaxially around the driven shaft 12.

In the example illustrated this sleeve 22 is fastened to the fixed casing 16 and at its end situated at the greater distance from the clutch assemblies A, B has the shoulder 23 forming a radial projection against which the casing 21 abuts.

In practice this sleeve 22 is in this case the fixed so-called trumpet sleeve which usually surrounds the driven shaft 12 at its entry into the gearbox following the clutch.

The end of each of the arms 24, 24' of the casing 21 has formed in it a blind chamber 25, 25' forming a cylinder open in the direction of the clutch assemblies A, B, symmetrically on each side of a plane of axial symmetry PS passing through the median zone of the stirrup and through the axis of the assembly, FIG. 2.

In each of the cylinders 25, 25' a piston 26, 26' is mounted for axial movement, and in the example illustrated the axes of movement of these pistons form a transverse plane $PT_2$ which, in relation to the median zone of the casing 21, is disposed beyond the axial plane $PT_1$ which is perpendicular to the axial plane of symmetry PS mentioned above.

In the example illustrated the median zone 27 of the stirrup likewise has formed in it a blind recess 28 forming a cylinder for a third piston 29 whose axis of movement is in the axial plane of symmetry PS. The cylinders 25, 25' are connected to the cylinder 28 by internal ducts 30, 30' and the cylinder 28 is in communication with an aperture 31 which can be connected to a pipe 32, for example a flexible pipe, for supplying fluid under pressure to the unit 20.

Drain apertures 33, 33' are provided for the cylinders 25, 25'.

In the example illustrated the casing 21 is attached by bolts 34, 34' to a support plate 35 which has a cut-out 36 forming a gripping handle.

In the example illustrated the bottom edge of this cut-out 36 is bordered by two lugs 37, 37' which extend axially in the opposite direction to the clutch assemblies A, B in order to cooperate by engaging with or abutting a projection 41 on the fixed casing 16, or any other fixed element.

Finally, in the example illustrated the pistons 26, 26' and 29 bear against a thrust ring 38 formed by a ring 39 mounted slidably on the sleeve 22 and integral with a radial flange 40 against which the pistons 26, 26', and 29 bear, a ball bearing 42 engaged on the ring 39 and abutting the flange 40, and a cap 43 carried by the bearing 42 and provided radially with a collar 44 for acting on the clutch release levers 17A, 17B.

Since the casing 21 bears against the projection formed radially by the shoulder 23 at the end of the sleeve 22, which is fixed, when fluid under pressure — in practice a liquid under pressure — is delivered through the pipe 32 and the duct 30, 30' into the cylinders 28, 25, and 25' of the casing 21, the pistons 29, 26, and 26' are displaced axially in the direction of the arrow F and, through the medium of the thrust ring 38, control the pivoting of the clutch release levers 17A, 17B in the direction effecting the release of the friction discs 11A, 11B.

It will have been noted that the pistons 29, 26, and 26' are adapted to apply a thrust the resultant of which is close to the axis of the sleeve 22.

As will have been understood, the unit 20 is placed in position simply by transverse engagement of its casing 21 on the sleeve 22; this engagement is possible even when the flexible supply pipe 32 is already connected to this casing, the circuit having been previously bled. This engagement is facilitated by the gripping handle 36.

The casing 16 has an aperture permitting this engagement.

In practice the unit 20 according to the invention can be held on the sleeve 22 by its own action, simply through gravity.

However it may be provided with various retaining means, such as a spring connected to any fixed element and attached to this element, or engaging or abutting lugs 37, 37' which have been referred to above and which surround a projection 41 on the fixed casing.

Figure 4:
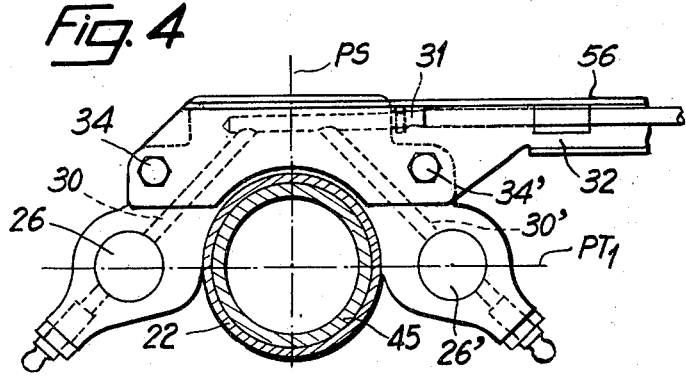

In the example illustrated in FIGS. 3 and 4 the sleeve 22 is mounted for sliding on the fixed sleeve or "trumpet" 45 which surrounds the driven shaft 12 and its entry into the gearbox.

At its end situated at a greater distance from the clutch assemblies A, B the sleeve 22 is provided with a projection which in the example illustrated is composed of a circlip 46, against which the casing 21 of the unit 20 of the invention abuts.

In the example illustrated this unit has only two pistons 26, 26' and the plane formed by the axis of movement of the latter coincides with the axial plane $PT_1$ which is perpendicular to the axial plane of symmetry PS. Finally, in the example illustrated, the support plate 35 to which the casing 21 is fastened forms laterally a gutter-shaped extension 56, which enables it to be gripped and placed in position and which protects the supply pipe 32.

As previously, the pistons 26, 26' act on a thrust ring 38 and the latter is in contact with the clutch release levers 17A.

Furthermore, at its end nearer the clutch assemblies A and B, the sleeve 22 is likewise provided with a projection such as a radial collar 48, to abut a bearing 49 the cap 50 of which has a flange 51 in contact with the free end of the clutch release levers 17B, between the latter and the clutch assemblies A, B.

In addition, the push-rods 47B associated with the clutch release levers 17B are attached to them at a point situated beyond their pivot, in relation to the axis of the clutch.

When fluid under pressure is delivered into the unit 20 according to the invention, on the one hand the pistons 26, 26' of the unit push the thrust ring 38 back in the direction of the arrow F, and therefore pivot the clutch release levers 17A in one direction, and on the other hand the casing 21 applies traction to the sleeve 22 in the opposite direction to the arrow F, and through its radial collar 48 and the cap 50 of the bearing 49 abutting the same this sleeve effects the pivoting of the clutch release levers 17B in the other direction.

The friction discs 11A, 11B are simultaneously released. Thus, according to this arrangement and because of the sliding of the sleeve 22, on the one hand thrust is applied to the clutch release levers 17A associated with the clutch assembly A, and on the other hand traction is applied to the clutch release levers 17B associated with the clutch assembly B; this has in particular the effect that the clutch release lever 17A, 17B may advantageously be of identical construction, thus permitting savings in manufacture and storage and in addition facilitating assembly.

Figure 5:
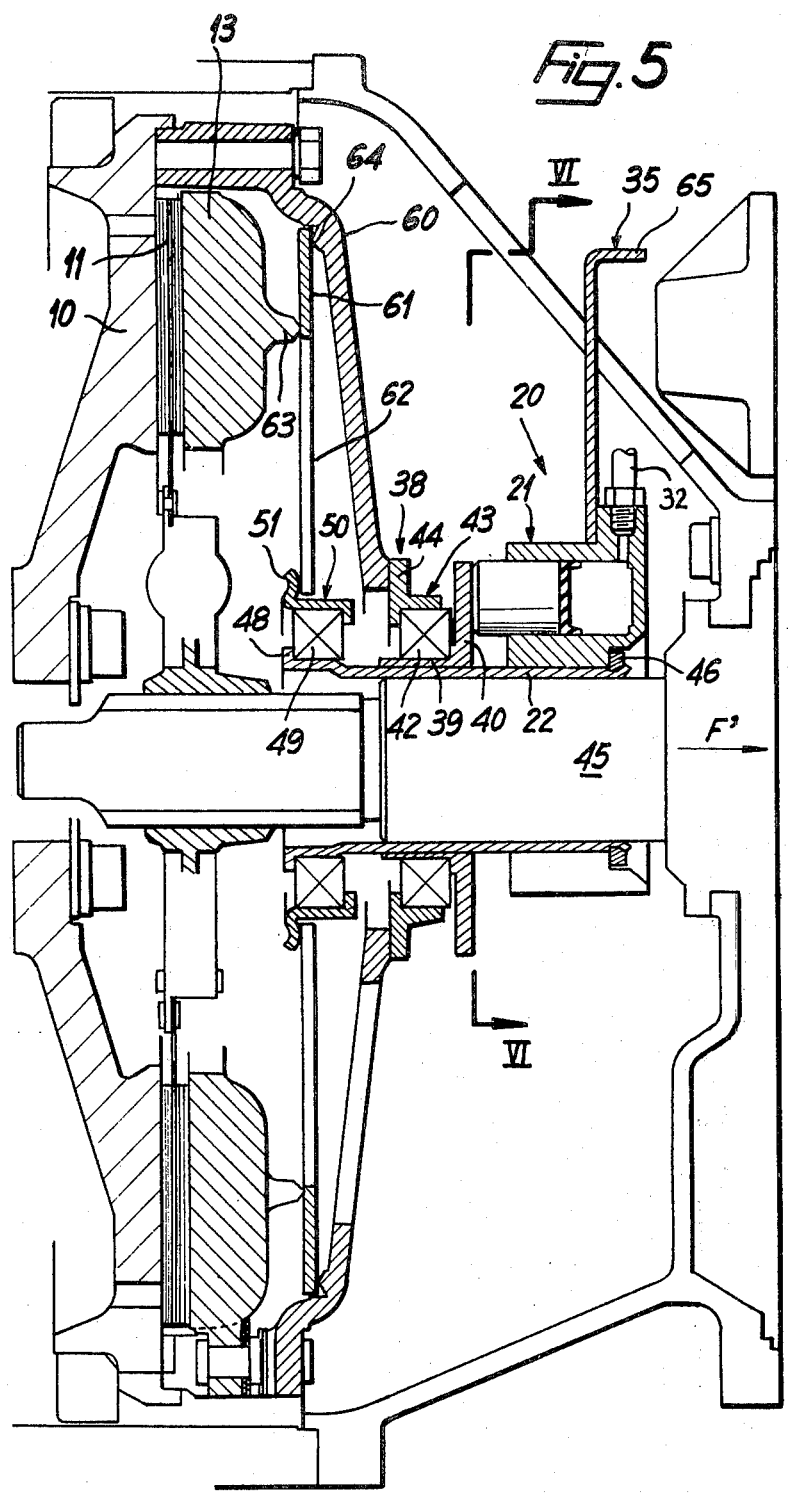

FIGS. 5 and 6 illustrate the application of the invention to a clutch having only one clutch assembly, which is composed of a reaction plate 10, a friction disc 11, and a pressure plate 13.

In the example illustrated a cover 60 is attached to the reaction plate 10 around the pressure plate 13, and the elastic means associated with the latter are composed of an elastic washer of the Belleville washer type, which is extended radially in the direction of the axis of the clutch by fingers 62 forming clutch release levers.

By its internal periphery of the elastic washer 61 bears against an annular fillet 63 on the pressure plate 13, and by its outer periphery it bears against an annular fillet 64 on the cover 60.

This clutch is operated with the aid of a unit 20 of the type described above.

This unit comprises a casing 21 having two arms and which is engaged transversely on a sleeve 22 which, as in the embodiment illustrated in FIGS. 3 and 4, is a traction sleeve mounted for axial movement on a fixed sleeve or trumpet 45. This casing 21 bears against a circlip 46 attached to one end of the sleeve 22.

Three pistons 26, 26', and 29 mounted for axial movement in the casing 21 bear against a ring 38 which abuts the cover 60. This ring 38 is thus fixed, but as previously it is provided with a ring 39 integral with a flange 40, a bearing 42 engaged on the said ring, and a cap 43 having a radial flange 44 and carried by this bearing.

At the other end of the sleeve 22 a bearing 49 abuts a radial collar 48 of the said sleeve and carries a cap 50 provided with a substantially radial flange 51 in contact with the free end of the clutch release levers 62, this flange being disposed between the said clutch release levers and the friction disc 11.

The support plate 35 to which the casing 21 is attached has no aperture in the example illustrated in FIGS. 5 and 6 and is simply provided with a flange 65 facilitating gripping.

When fluid under pressure is delivered into the unit 20, the pistons 26, 26', and 29 bear against the ring 38, which in turn bears against the cover 60, and the casing 21 effects the movement of the sleeve 22 in the direction of the arrow F' in FIG. 5; by means of the bearing 49 and the cap 50 of the latter this sleeve 22 then applies traction to the clutch release lever 62, thereby effecting the release of the friction disc 11.

In a modified embodiment (not illustrated) the sleeve 22 on which the casing 21 is engaged is centred by its outer periphery on the cover 60.

For this purpose it is sufficient for the ring 38, against which the pistons 26, 26', and 29 bear, to be fixed to the cover 60, for example by fastening to this cover 60 the flange 44 of the cap 43 of the bearing 40 provided for this ring, and for the sleeve 22 to be centred by its outer periphery on the ring 39 which also forms part of the ring 38.

This modified embodiment provides the advantage that the trumpet 45 can thus be eliminated.

According to another modified embodiment, which is not illustrated, the ring 38 is reduced to a bearing, the outer cage of which bears through a circlip against the cover 60, and it is the casing 21 that bears against this ring; the associated pistons act on a radial collar rigidly attached, for example by welding, to the end of the sleeve 21 situated further from the friction disc 11, and at the other end of this sleeve the cap of the bearing 49 provided there is reduced to a ring surrounding this bearing. This ring is supported against a circlip fastened to the outer cage of the said bearing, of which the inner cage bears against a circlip carried by the sleeve 22.

In the foregoing the unit 20 according to the invention is introduced transversely in relation to the axis of the clutch by a vertical movement of translation from bottom to top.

In the modified embodiment illustrated diagrammatically in FIG. 7, this introduction is effected by pivoting, as indicated by the arrow 70.

In the embodiment illustrated diagrammatically in FIG. 8, this introduction is effected by lateral movement of translation, in a movement from right to left, as indicated by the arrow 71 or by the reverse movement from left to right.

The present invention is of course not limited to the embodiment described and illustrated, but includes any alternative construction and/or combination of their various elements.

In particular the number, the arrangement, and the method of action of the fluid controlled pistons provided in the unit according to the invention may vary, and it is of not consequence whether these pistons act in the direction of the actual clutch, as illustrated in FIGS. 1 to 6, or in the opposite direction, as described with reference to a modified embodiment which is not illustrated.

In other words, either the casing or the piston may cooperate either with a thrust ring or with a fixed ring, while the other of these elements cooperates either with a fixed shoulder or with a projection carried radially by a traction sleeve.

Furthermore, the unit according to the invention may be equipped with pistons moving in opposite directions in cylinders which are open at both ends.

Finally, in the case of operation by means of a fluid, it is of no consequence whether this fluid is hydraulic or pneumatic.

In all cases the means of operating the clutch according to the invention preferably comprise pistons adapted to apply a thrust whose resultant is close to the axis of the associated sleeve.

In various modified embodiments which are not illustrated, detachable connecting means connect the two arms of the stirrup-shaped casing of the unit according to the invention.

These removable connection means may for example comprise elastic means, such as a spring, or rigid means articulated to one of the arms of the stirrup and adapted to be connected to the other; in the latter case these connecting means may in turn comprise one or more pistons, the assembly comprising the casing and the removable connection means surrounding the sleeve.

I claim:

1. In a clutch comprising at least one clutch assembly which includes a reaction plate adapted to be rotationally fastened on a first shaft, a friction disc movable axially in relation to the reaction plate and adapted to be rotationally fastened on a second shaft, a pressure plate movable axially in relation to the reaction plate and rotationally fastened thereto, elastic means urging the pressure plate toward the reaction plate in order to clamp the friction disc, at least one pivoting clutch release lever to unclamp the friction disc, and fluid-operated means adapted to operate and pivot said release lever; the improvement comprising a sleeve coaxial with said shafts, said fluid operating means being a removable unit with stirrup-shaped casing means that is received and retained on said sleeve by mere displacement transversely with respect to the sleeve to bring the casing means into engagement with the sleeve, the stirrup-shaped casing means having two arms, each of said arms being formed with a cylinder receiving an axially movable piston, the cylinders being disposed symmetrically to each side of an axial plane of symmetry passing through said casing means, the axes of displacement of said pistons defining a plane perpendicular to said axial plane of symmetry, the axis of the sleeve being located between the last-mentioned plane and the bite zone of the stirrup-shaped casing means joining the arms thereof, the bite portion of the stirrup-shaped casing means having a cylinder receiving a third axially movable piston whose axis of displacement is in said axial plane of symmetry.

2. A clutch according to claim 1, said piston applying a thrust the resultant direction of which is close to the axis of the sleeve on which the casing is engaged.

3. A clutch according to claim 1, wherein said cylinders formed in the stirrup-shaped casing means are blind cylinders.

4. A clutch according to claim 1, wherein the stirrup-shaped casing means is fastened to a support plate provided with gripping means.

5. A clutch according to claim 1, and retaining means for retaining the casing means in position on the sleeve.

6. A clutch according to claim 1, wherein the sleeve on which the stirrup-shaped casing means is engaged is axially fixed and at one of its ends has a radial projection against which one of the stirrup-shaped casing means and a piston movable in the casing means abuts.

7. A clutch according to claim 1, wherein the removable unit is held on the sleeve merely by the force of gravity thereon.

8. A clutch according to claim 4, wherein the gripping means is defined by a cut-out formed in said support plate.

9. A clutch according to claim 5, wherein the retaining means comprises latching means.

10. A clutch according to claim 5, wherein the retaining means is a spring.

11. A clutch according to claim 2, characterised in that said sleeve is axially movable and at one of its ends has a radial projection against which one of the stirrup-shaped casing means or a piston movable in the casing means abuts.

12. A clutch according to claim 11, characterised in that said sleeve is centred by its outer periphery on a cover fastened to the reaction plate.

13. A clutch according to claim 12, characterised in that at each of its two ends the clutch on which the stirrup-shaped casing means is engaged is provided with a radial projection, one said projection being adapted for the abutment of one of the stirrup-shaped casing means and a piston movable in the casing means, and the other acting on the clutch release lever, while one of the stirrup-shaped casing means and the piston movable in the casing means bears against a ring fastened axially in relation to the said sleeve.

14. A clutch according to claim 13, characterised in that the said ring is axially fastened to the cover and comprises a race of a centring bearing interposed between the cover and the sleeve.

15. A clutch according to claim 12, characterised in that two clutch assemblies are provided disposed axially one behind the other, each being operated by at least one clutch release lever, and that said sleeve has at each of its ends a radial projection, one of these projections serving as an abutment for one of the stirrup-shaped casing means and a piston movable in the casing means and the other serving to act on the clutch release lever of the first clutch assembly, one of the stirrup-shaped casing means and the piston movable therein acting on the lever of the second clutch assembly.

* * * * *

Disclaimer 3,907,085.—*Michel Rist*, Boulogne, France. CLUTCH WITH REMOVABLE HYDRAULIC OPERATOR. Patent dated Sept. 23, 1975. Disclaimer filed Dec. 14, 1976, by the assignee, *Societe Anonyme Francaise du Ferodo*.

Hereby enters this disclaimer to claims 11–15 of said patent.

[*Official Gazette May 3, 1977.*]